(12) United States Patent
Ristock (10) Patent No.: US 8,085,693 B2
(45) Date of Patent: Dec. 27, 2011

(54) VIRTUALIZATION OF ONE OR MORE SETS OF PHYSICAL CONTACT CENTER RESOURCES FOR USE BY ONE OR MORE VIRTUAL CONTACT CENTERS

(75) Inventor: Herbert Willi Artur Ristock, Walnut Creek, CA (US)

(73) Assignee: Genesys Telecommunications Laboratories, Inc, Daly City, CA (US)

( * ) Notice: Subject to any disclaimer, the term of this patent is extended or adjusted under 35 U.S.C. 154(b) by 293 days.

(21) Appl. No.: 12/392,318

(22) Filed: Feb. 25, 2009

(65) Prior Publication Data

US 2010/0215169 A1    Aug. 26, 2010

(51) Int. Cl.
*H04M 7/00*    (2006.01)

(52) U.S. Cl. .............. 370/270; 379/265.05; 379/265.06; 709/226; 709/229

(58) Field of Classification Search .................. 370/270, 370/400, 401, 419, 420, 463; 379/265.02, 379/265.05, 265.06, 265.07, 265.09, 266.01; 709/202, 203, 219, 226, 229
See application file for complete search history.

(56) References Cited

U.S. PATENT DOCUMENTS

| | | | |
|---|---|---|---|
| 6,831,966 B1 * | 12/2004 | Tegan et al. | 379/88.16 |
| 7,769,160 B1 * | 8/2010 | Cordell et al. | 379/265.05 |
| 2002/0073208 A1 * | 6/2002 | Wilcock et al. | 709/227 |
| 2002/0091832 A1 * | 7/2002 | Low et al. | 709/227 |
| 2007/0230681 A1 * | 10/2007 | Boyer et al. | 379/265.1 |
| 2008/0107256 A1 * | 5/2008 | Jaiswal et al. | 379/265.12 |
| 2008/0123559 A1 * | 5/2008 | Haviv et al. | 370/255 |
| 2010/0054439 A1 * | 3/2010 | Salame et al. | 379/201.12 |
| 2010/0131876 A1 * | 5/2010 | McGuire et al. | 715/765 |
| 2010/0172485 A1 * | 7/2010 | Bourke et al. | 379/265.05 |
| 2011/0113127 A1 * | 5/2011 | Tameshige et al. | 709/220 |

* cited by examiner

*Primary Examiner* — Hassan Phillips
*Assistant Examiner* — Duc Duong
(74) *Attorney, Agent, or Firm* — Donald R. Boys; Central Coast Patent Agency, Inc (57) ABSTRACT

A system for virtual representation of physical contact center resources includes a server coupled to a wide-area-network (WAN), a digital medium accessible to the server, and a resource virtualization application executable from the digital medium to run on the server, characterized in that at least one physical contact center having physical resources has access to the server over the network wherein the resource virtualization application categorizes and represents the physical resources in an abstract way for access by customers of one or more virtual contact centers.

18 Claims, 5 Drawing Sheets

VIRTUALIZATION OF ONE OR MORE SETS OF PHYSICAL CONTACT CENTER RESOURCES FOR USE BY ONE OR MORE VIRTUAL CONTACT CENTERS

CROSS-REFERENCE TO RELATED APPLICATIONS

NA

BACKGROUND OF THE INVENTION

1. Field of the Invention

The present invention is in the field of telephony communications including data network telephony (DNT) and Internet Protocol network telephony (IPNT) and pertains particularly to a virtualization of contact center resources for use by one or more virtual contact centers to provide services to subscribers.

2. Discussion of the State of the Art

In the field of telephone communications, state-of-art contact centers are continually being improved. Many centers today can provide services to customers accessing the center through a telephone network or through the Internet network. Calls can now be routed between disparate networks and into a contact center queue from virtually any network-connected access point. A physical contact center may include one or more telephone switching facilities and internal telephone system; a local area network (LAN); connected workstations (service terminals), an interactive voice response system; an email routing system; one or more application servers; and one or more data management systems including customer relations management and internal data management systems.

Many companies outsource their sales and customer service functions to third-party-managed service organizations that provide contact center services for the companies according to a service level agreement (SLA). The managed service provider may provide or allow access to contact center infrastructure and equipment; computing infrastructure and equipment; service agents with appropriate skills; payment processing; and data management services.

A physical contact center may service more than one company up to its capacity for handling the traffic. Service level objectives (SLOs) are typically defined regarding service levels for each company relative to business interaction with customers. Estimated wait time (EWT) in queue and other quality of service (QoS) issues are at the forefront. A physical set of contact center resources has a defined limit in what it can provide in the way of service capacity. It may be underutilized during wan periods and over utilized during peak periods causing a loss in business and internal stability.

Some managed service providers have formed federations comprising multiple physical contact centers networked together to form a federation of services. A federated contact center typically has a service level agreement (SLA) with a company to provide specific services at a specific level of quality of service. In a federated contact center system resources may be distributed over a network and incoming traffic for a specific company can be distributed to multiple service locations for handling, usually transparent to the caller.

There are many different models available in the art for providing contact center services, including federated services, however all of these service models are static models and particularly inflexible relative to short term demands of a subscriber company. It has occurred to the inventor that if a physical set of resources could be virtualized by exposing those resources in an abstract way to a virtual interface, then the physical resources could be managed for use much more efficiently and in a more flexible manner with respect to shifting service demands.

Therefore what is needed in the art is a virtual contact center system separated by a virtualization layer from one or more physical contact centers. A system such as this would be more efficient and add more flexibility than a federated system of call centers.

SUMMARY OF THE INVENTION

The problem stated above is that flexibility is desirable for providing contact center services, but many of the conventional models for providing contact center services are static models and particularly inflexible relative to short term demands of a subscriber company. The inventors therefore considered functional elements of a contact center, looking for elements that exhibit a potential for abstraction that could potentially be harnessed to provide contact center functionality but in a manner that would not create inflexibility especially over shot term demands of a provider company.

The present inventor realized in an inventive moment that if, at the point of need, contact center resources could be represented virtually and exposed in an abstract way, significant resource flexibility might result. The inventor therefore constructed a unique system for representing physical contact center resources in a virtual way to companies requiring contact center services that allowed resources to be searched and added or removed according to need and that allowed such services to be dynamically allocated and exposed in virtual representation. A significant improvement in resource management results, with no complexities in routing or general services created.

Accordingly, in one embodiment of the present invention a system for virtual representation of physical contact center resources is provided. The system includes a server coupled to a wide-area-network (WAN), a digital medium accessible to the server, and a resource virtualization application executable from the digital medium to run on the server. At least one physical contact center having physical resources has access to the server over the network wherein the resource virtualization application categorizes and represents the physical resources in an abstract way for access by customers of one or more virtual contact centers.

In one embodiment the WAN is the Internet network including any connected sub networks. In one embodiment physical contact center resources are configured for representation as available virtual resources using a client portion of the resource virtualization application. The one or more virtual contact centers utilize the resources of one or more physical contact centers. In one embodiment the physical contact center resource is an automated system, a live agent, or a group of live agents.

In one embodiment a virtual representation of a contact center resource is exposed only to a virtual contact center that requires the resource and can use the resource to transact business. In one embodiment a virtual contact center may expose training materials and support information to one or more physical contact centers using a client portion of the virtualization application.

In one embodiment the virtualization application includes an interaction management layer for virtually representing and tracking active interactions being processed by the available physical resources. In one embodiment the virtualization application includes a business management layer for keeping track of the business transacted through one or more virtual contact centers.

In one embodiment the virtualization application includes a resource management layer for exposing resources and for providing reportable statistics about the use of and general states of those exposed resources.

In one aspect of the invention a method is provided for virtually representing a physical contact center resource to a specific customer base of a virtual contact center comprising the steps (a) providing one or more access points including contact data to the customer base, (b) locating and qualifying the contact center resource for use by the customer base, (c) representing the resource of step (b) as an abstract entity in a software interface accessible to a human operator authorized to provide services to the customer base, and (d) mapping the contact data provided to the customer base to the contact data of the contact center resource during routing.

In one aspect of the method in step (a) the one or more access points include a telephone switch and or a Web page. In one aspect in step (c) the virtual contact center is visible through a client interface running on a computing device having a user display. In one aspect in step (b) a directory is used to locate available resources and qualification thereof determined by matching capabilities with service requirements for resource utilization.

In one aspect of the method in step (c) the resource is represented by one or more queue icons. In a variation of this aspect the one or more queue icons represent an agent queue, a queue for an automated service, or a queue for a group of agents.

In one aspect of the method a step (e) is added for creating virtual interaction events and for tracking progress of the interactions through the virtual contact center. In a preferred aspect of the method in step (b) physical resources may be added or removed based on current needs of the virtual contact center.

DETAILED DESCRIPTION

The inventors provide a system and methods for enabling interaction with contact center resources through a virtual representation of those resources. The present invention is described in enabling detail in the following examples, which may represent more than one embodiment of the invention.

Figure 1:
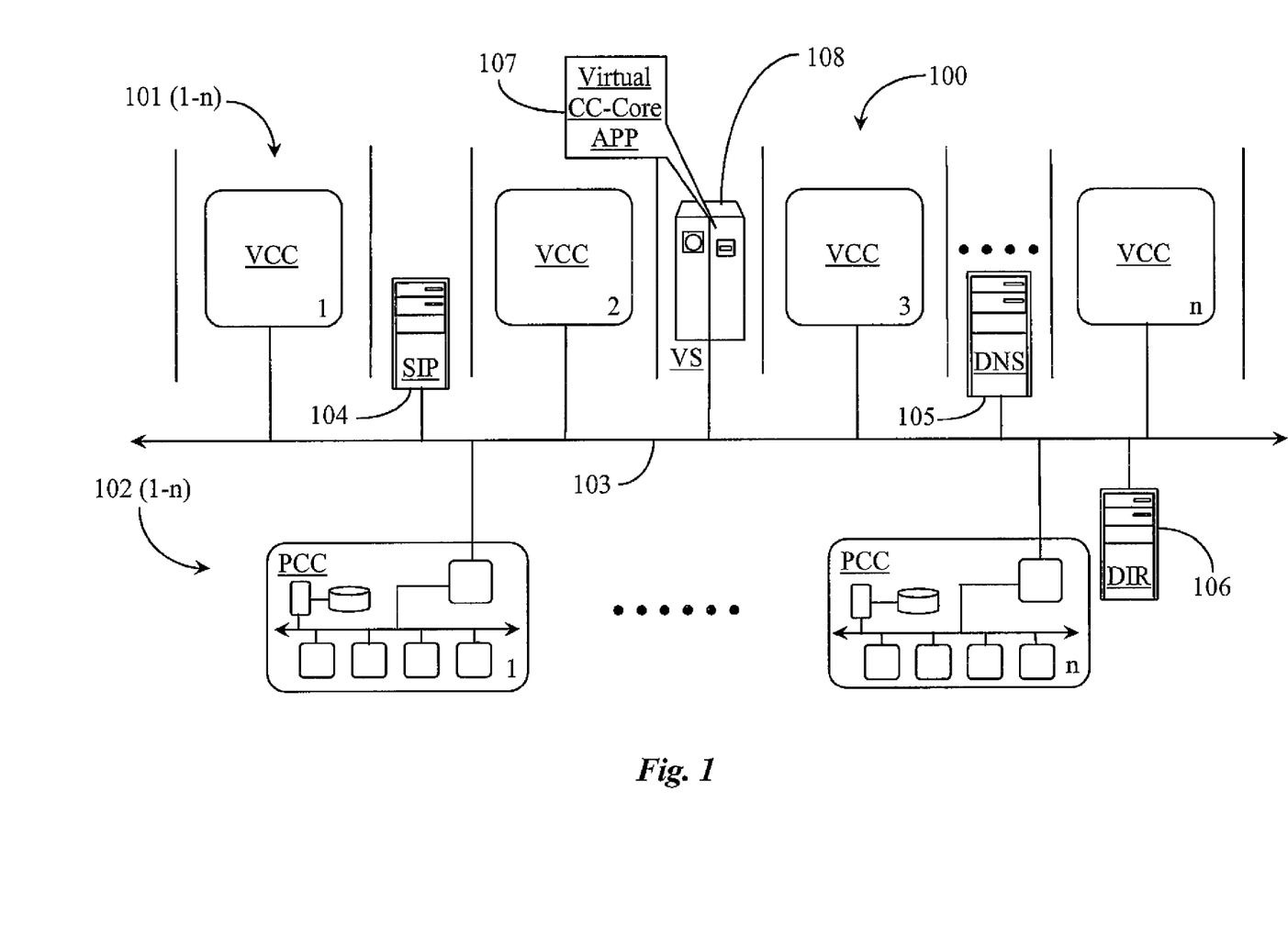
FIG. 1 is a block diagram illustrating a virtual contact center system according to an embodiment of the present invention.

FIG. 1 is a block diagram illustrating a virtual contact center (VCC) system 100 according to an embodiment of the present invention. VCC system 100 is logically represented as a plurality of VCCs 101 (1-n) connected to a network backbone 103. Network backbone 103 is that of a wide-area-network (WAN) in a preferred embodiment and may be referred to as WAN 103 hereafter in this specification. WAN 103 may be a corporate or private WAN in one embodiment. In one embodiment WAN 103 represents the Internet network including any connected sub networks. Sub networks may include data-network-telephone (DNT) networks and the public-switched-telephone-network (PSTN). Wireless telephony carrier networks may also be sub networks connected to WAN 103.

VCCs 101 (1-n) represent individual standalone contact centers that may be hosted as individual software applications on a like number of computing devices having a graphics user interface display. A VCC such as VCC 101 (1) in this example is a client application for entities that require contact center services but do not wish to provide those services directly. The VCC system of the invention is provided by a third-party service that hosts a virtualization server (VS) 108 connected to WAN 103. VS 108 includes an accessible digital medium (not illustrated) that supports a Virtual CC (VCC) core application 107 running on and executable from the server. VS server 108 may also host a registration and account interface for registering provider companies for VCC services and providing account information to subscribed users.

A plurality of physical contact centers (PCCs) 102 (1-n) are illustrated in this example and have connection typically through a sub network and gateway to WAN 103. A PCC like PCC 102 (1), for example, represents a grouping of equipment and resources typical of a contact center. PCC 102 (1) has within or has access to a computer telephone integrated (CTI) telephone switch or Internet Protocol/Private Branch Exchange (IP/PBX) switch for internal call distribution. Each PCC 102 (1-n) has a local area network (LAN) represented in this example as a double arrow. A variety of equipment and resources may be available within a PCC and accessible via LAN. In this example a plurality of agent workstations are illustrated within each center. An agent station may include an IP and/or a connection oriented switched telephony (COST) telephone and a LAN-connected computer. Agents within each center typically handle live interaction including calls and messages. An application server and a data repository are also represented within each PCC.

A PCC represented in this example may be closely contained within a physical site and dedicated as a contact center or it may be a loosely associated group of resources that are not necessarily contained within a same physical site. A PCC as illustrated herein represents a state of art PCC and therefore may be assumed to contain all of the equipment and functionality for handling all of the sorts of communications.

WAN 103 supports a session initiation protocol (SIP) server 104 adapted to provide SIP functionality to interaction handling over an Internet Protocol (IP) environment. In one embodiment SIP is used to route and track interaction events and to dynamically allocate resources. SIP is a text-based telephony-signaling protocol adapted for voice over Internet Protocol (VoIP), video, messaging and routing. Other telephony protocols may also be used like H.323 VoIP protocol. SIP is an established protocol for initiating, establishing, and tearing down interactive voice/video sessions and messaging sessions using instant messaging applications. SIP may also be used to report rich presence information to subscribing entities.

WAN 103 includes a domain name server (DNS) 105 connected to WAN 103. DNS 105 provides domain name location services. A directory server (DIR) 106 is illustrated connected to WAN 103. DIR 106 may be a presence directory server for reporting presence of PCCs on the network. VS 108 among other things is charged with exposing available physical contact center resources like those involved with PCCs 102 (1-n) to VCCs 101 (1-n) in an abstract and dynamic fashion. VCC core application 107 is adapted in one embodiment to match available PCC services and resources to individual VCCs according to published needs and real time call and message volume requirements of a VCC during peak and WAN periods.

One VCC 101 (1-n) may utilize resources of one or more than one PCC 101 (1-n). The resources are exposed or published to a VCC through VS 108 as virtual resources. PCCs 102 (1-n) may expose services to more than one VCC. Service-to need mapping may include qualifications for a PCC or PCC resource like specific skill requirements for live agents. Service level agreements and quality of service statements may be part of any criteria for VCC utilization of PCC services.

In practice of the invention a company seeking contact center services may register with VS 108 and may receive a client application (not illustrated here) for configuring a VCC and monitoring activity and results of activity including all related business that occurs through the newly created VCC. The VCC or client application may reside on a server with a computer-accessible control interface or directly on a desktop or laptop computer having access to a digital medium suitable for storing CRM data, business data, and transaction data. The client interface may be adapted as a lightweight application for a network-capable appliance like a cellular telephone, a personal digital assistant, or an IP telephone terminal, which may be a software terminal.

Once the client has a VCC client application installed and open, the client may begin inputting data that is used to set-up and configure the functionality for the VCC. For example, contact numbers and defined customer access points must be mapped to virtual services that represent physical service access points.

A company seeking to provide contact center services may register with VS 108 and may receive a client application (not illustrated here) for configuring available resources for virtual representation. In addition to provision of physical contact center resources, cost accounting and statistics reporting is provided for the business that the PCC handles on behalf of one or more virtual contact centers. Cost accounting and statistical reporting is provided to each separate VCC in a case where more than one VCC utilizing resources of a single PCC.

Each client application (VCC and PCC) communicates directly to the VCC application core (VCC APP 107) hosted on a server maintained by the third-party service such VS server 108. Customers of a company running a VCC application are presented with contact information to access and to interact with virtual agents, agent groups, or automated services represented in the VS core application. An administrator or other authorized person may view statistics and virtual activity from a computing interface of the VCC client application.

Figure 2:
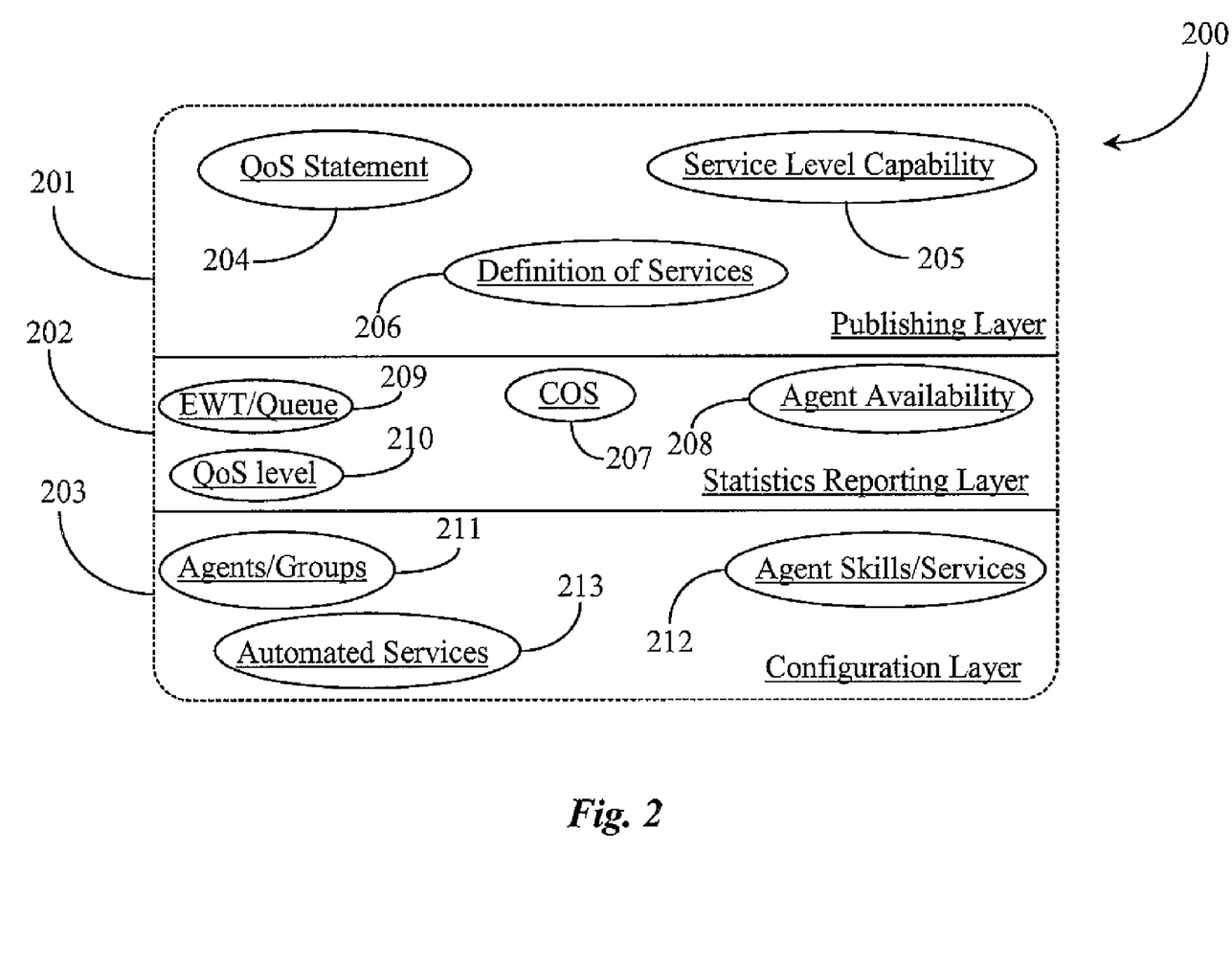
FIG. 2 is a block diagram illustrating components of a physical contact center client application according to an embodiment of the present invention.

FIG. 2 is a block diagram illustrating components of a physical contact center client application 200 according to an embodiment of the present invention. Client application 200 is adapted to be stored on and executed from a digital medium accessible to at least one PCC server having network connection to a parent or core application server such as VS 108 of FIG. 1. PCC client 200 has a publishing layer 201. Publishing layer 201 allows a company seeking to provide contact center services to publish information relative to the definition of and quality of services.

Publishing layer 201 can be used to publish a QoS statement 204, a definition of available services 206, and a service level agreement 205. QoS 204 may describe available bandwidth and other network quality and service quality concerns. Definition of services 206 describes the types of available services including skills of agents, voice application services, Interactive Voice Response (IVR) services, Web-based services and so on. Definition of services includes the physical contact data for accessing those services in routing.

PCC client 200 includes a configuration layer 203. Configuration layer 203 is adapted to enable a knowledge worker to configure services for virtualization such as agent groups 211, automated services 213, and agent skills and specific services available through them. For an agent group operating from a PCC, a virtual agent queue may be represented in the main application and exposed to one or more associated VCCs. Automated services may include voice applications and scripting and IVR capabilities. In one embodiment Individual agents with specific skills may be configured as an agent group that may include agents from other PCCs or that may be home-based agents. All or a portion of or no services configured by a PCC may be exposed to the VCC application. The core application has the capability of dynamically allocating PCC services for VCC consumption. A PCC does not have to be confined to physical equipment and personnel grouping as previously described above.

PCC client 200 has a statistics reporting layer 202 adapted to provide real-time stats relative to ongoing business conducted within a PCC for a particular VCC. For example an agent availability statistic 208 is illustrated as a reportable statistic. Estimated wait time (EWT) 209 for a live agent of a PCC queue is a reportable statistic. Another reportable statistic may be a QoS level 210. Another reportable statistic illustrated in layer 202 is a cost of services (COS) statistic 207. COS stat 207 tracks what financial costs are being incurred by the VCC operator for business routed to a PCC resource or resources. All of the stats illustrated in this example are continuously or periodically updated and reported to the VCC.

Accounting relative to transactions handled by a PCC servicing one or more VCCs may be handled by a third-party billing service in one embodiment. In one embodiment transaction accounting is performed by the service of the invention. In this case there may be an optional layer added to PCC client 200 adapted to track and record transactions keeping the accounting process separate for a case where more than one VCC is being serviced by the PCC.

One with skill in the art of client-server applications will appreciate that such clients may not be distributed, but may be hosted on a Web server accessible to subscriber companies instead. One with skill in the art will also realize that there may be more or fewer component layers and components than that illustrated in this example without departing from the spirit and scope of the present invention.

Figure 3:
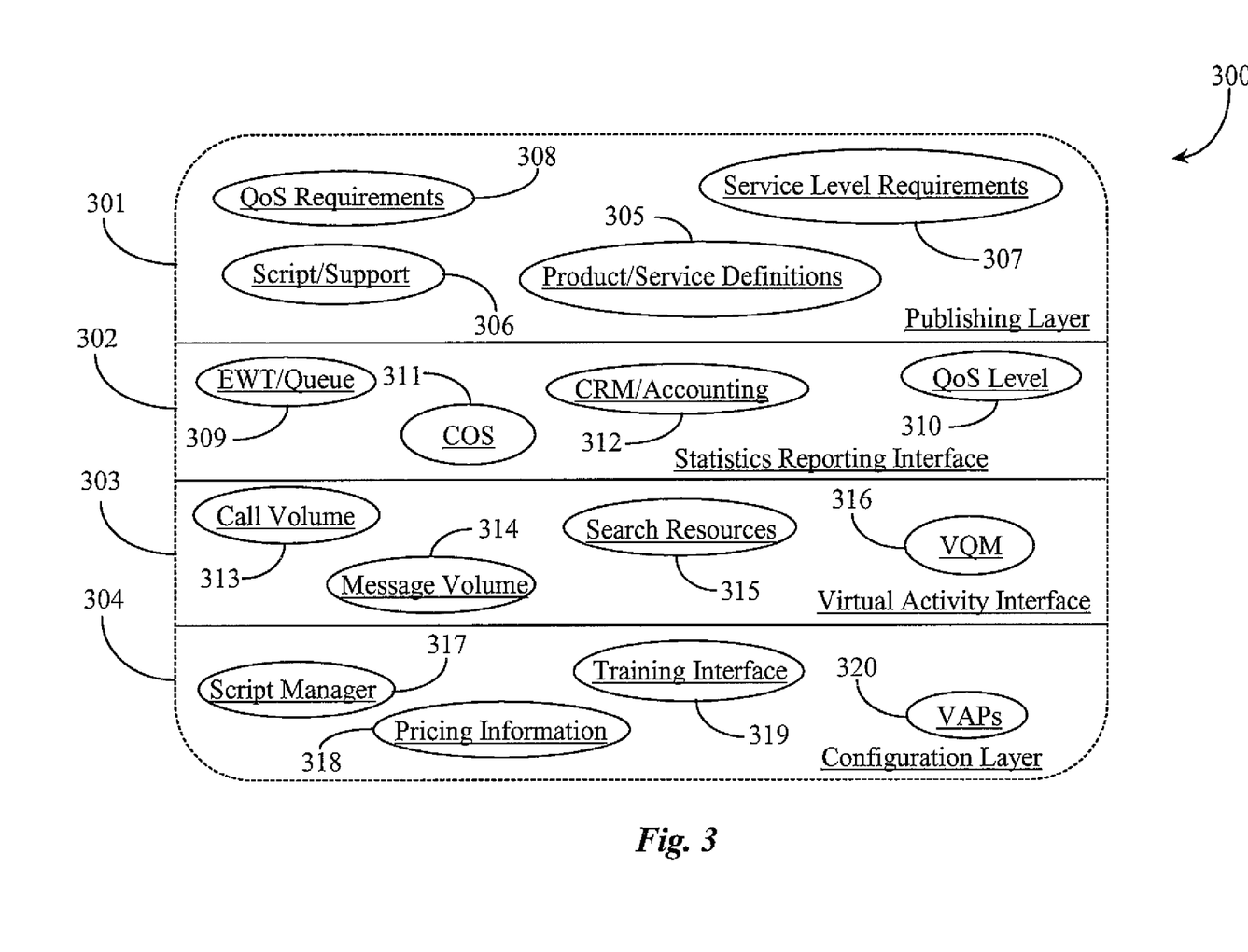
FIG. 3 is a block diagram illustrating components of a virtual contact center client application according to an embodiment of the present invention.

FIG. 3 is a block diagram illustrating components of a virtual contact center client application 300 according to an embodiment of the present invention. VCC client application 300 is adapted to be stored on and executed from a digital medium accessible to at least one VCC server having network connection to a parent or core application server such as VS 108 of FIG. 1. VCC client 300 has a publishing layer 301. Publishing layer 301 allows a company seeking contact center services to publish information relative to the service needs and requirements of the VCC company so that the appropriate PCC resources may be located and exposed for service.

Publishing layer 301 can be used to publish QoS requirements 308, a product/service definition statement 305, and a service level requirements statement 307. In one embodiment of the invention the service requirements of a VCC company are published to the service so that the service, acting as a broker, may locate published PCC capabilities and resources that best meet the service level requirements of the VCC host company. The product/service definitions are published so that a PCC client can decide if they have the resources to properly carry out transacting (products) and providing the appropriate servicing of the VCC customers that contact the center. In one embodiment scripting and training support materials 306 may be provided through the publishing layer to a subscribing PCC client or clients in the case of more than one PCC servicing a VCC.

VCC client application 300 has a statistics reporting interface 302 adapted to enable a VCC knowledge worker or other authorized person to view statistics reported by one more PCCs. For example, a worker accessing the interface directly or using a browser can view current EWT/Queue 309 for one or more queues. A COS stat 311 and a QoS level stat 310 is illustrated in the same interface. In one embodiment CRM data and full accounting of business handled through one or more PCCs can be viewed by expanding CRM/Accounting stat 312.

The statistics reporting interface may be presented in the form of an HTML page presented in a browser operated by a VCC knowledge worker. In some use cases statistics fed back to a VCC from actual PCC transaction and handling flow can help determine if more or fewer resources are needed. In one embodiment threshold levels might be set by the VCC operator for certain types of statistics. For example, if total EWT in a virtual queue has surpassed an acceptable threshold, the VCC may activate an additional exposed queue that is associated with the same or another PCC. In a given configuration, it is ideal that a VCC have enough exposed services to handle peak periods and that resources could be dropped off when no longer needed. Similarly, if it is detected that more resources are needed then the system may search for and qualify additional resources.

VCC client application 300 has a virtual activity interface 303 adapted to enable a VCC knowledge worker or other authorized person to view the interaction activity between customers of a VCC and one or more servicing PCCs. For example, a worker accessing the interface directly or using a browser can view current call volume figures 313. Message volume figures 314 may also be available and viewed. Such volumes may be broken down to virtual queue volumes currently in the system.

In one embodiment searching and adding resources may be performed by a VCC operator using a search interface 315 labeled search resources. The system looks for and qualifies resources based on VCC needs known to the system. The services are then exposed appropriately and are activated for use by the VCC. Activity interface 303 includes a virtual queue manager (VQM) adapted to manage and track all virtual queues created by the system to represent PCC resources being utilized by customers of the PCC.

VCC client application 300 includes a configuration layer 304 adapted to enable a VCC adapted to enable a VCC knowledge worker or other authorized person to configure the VCC and to provide at the configuration level any specialized data that a servicing PCC might need to enable service. In one embodiment a script manager 317 is provided at the configuration level and is adapted to enable configuration of scripting that can be used by live PCC agents or voice application services with IVR presentation facilities. A VCC operator may configure pricing information for products and services offered through the VCC. Pricing information 318 can be updated at will and is published for exposure to serving PCCs handling those products and services.

In one embodiment a training interface 319 is provided within configuration layer 304 and is adapted to expose various training scripts, manuals, specification or other support documentation or media to appropriate PCC agents. In a preferred embodiment skilled agents are provided that have the correct skills definitions for the products and services offered through a VCC. However, some training, vetting, or certification might be required for PCC agents before they are allocated to handle interactions relative to more complicated products or services of a VCC. The presence of such materials for configuration and publishing depends entirely on the requirements of the VCC.

VCC access points or VAPs 320 are configured with the service of the invention for the purpose of informing the core application which access points are maintained by the VCC for customer initiation. An access point may be a call option on a Web page or anywhere in a network where a customer may activate a call option to place a call to the VCC. An access point may also be a general email address or IM address used to direct customers to VCC messaging queues.

A VCC may publish both direct numbers and call back options for customers. The system of the invention maps contact numbers published for customers by a VCC to PCC equivalent numbers, which may be changed dynamically depending on resource utilization factors. In preferred aspects the VCC operator does not see the PCC agent group number or the identifications of any agents working the queue. The customers are routed to virtual queues representing the real resources and the correct numbers are used in routing to route the physical call to the PCC resource. While a call is being handled in a PCC it may be visible to the VCC operator as a customer event in a virtual queue representing that PCC resource.

One with skill in the art of server-client applications will appreciate that such clients may not be distributed in one embodiment but may be hosted on a Web server accessible to subscriber companies instead. One with such skills in the art will also realize that there may be more or fewer component layers and components than that illustrated in this example without departing from the spirit and scope of the present invention.

Figure 4:
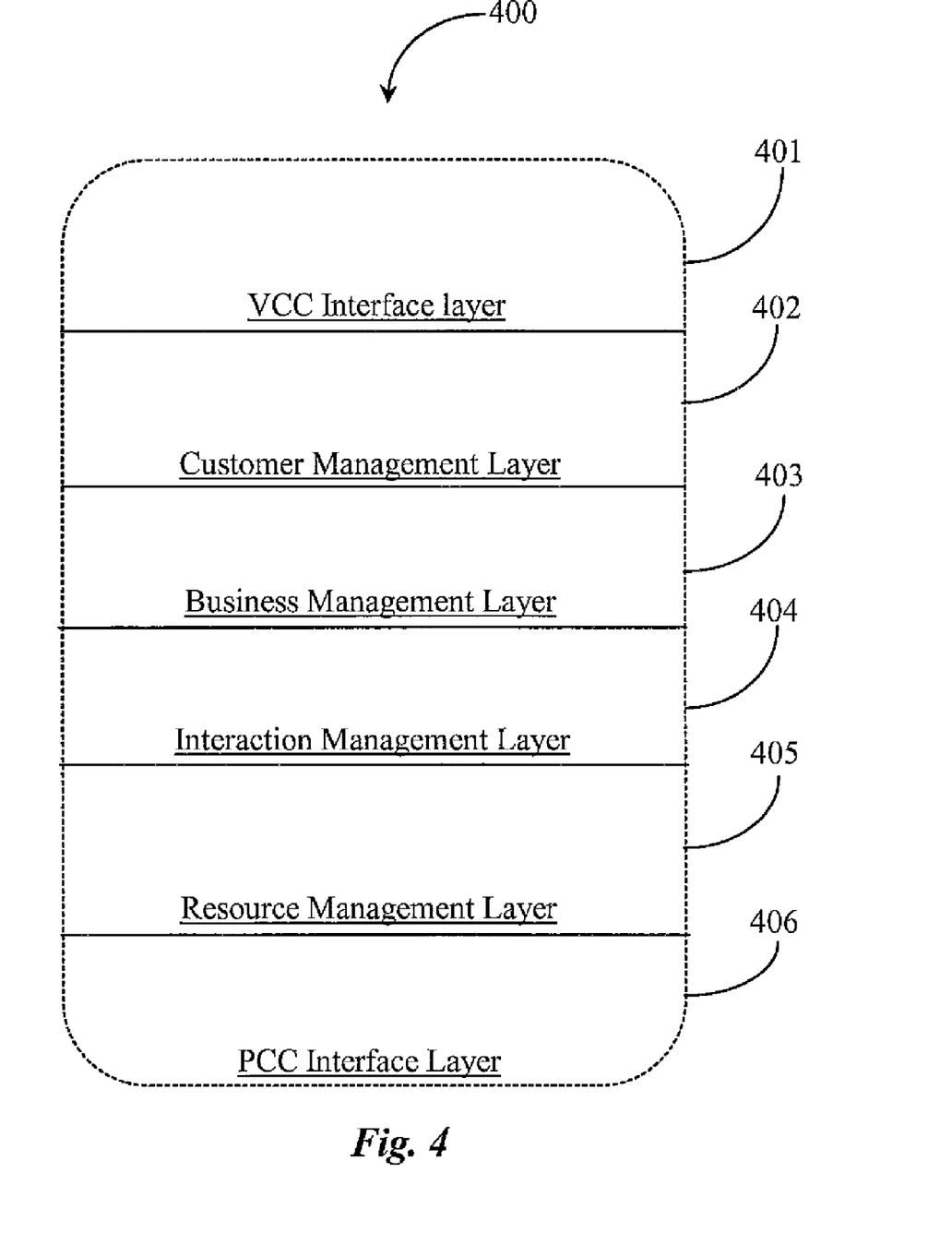
FIG. 4 is a block diagram illustrating components of a virtualization application according to an embodiment of the present invention.

FIG. 4 is a block diagram illustrating components of a core virtualization application 400 according to an embodiment of the present invention. Virtualization application core 400 is analogous to Virtual CC core APP 107 described further above in description relative FIG. 1.

The core part of the VCC service application exposes real PCC services and resources through virtualization to VCCs that may or may not elect to use those services. Core application 400 is represented herein without the client components, which are distributed in this example. Application 400 includes a VCC interface layer 401 adapted to enable the core application bi-directional communication with one or with a plurality of VCC client applications analogous to application 300 of FIG. 3. Application 400 includes a PCC interface layer 406 adapted to enable the core application bi-directional communication with one or with a plurality of PCC client applications analogous to application 300 of FIG. 3.

Application 400 includes a customer management layer 402 adapted to track and manage VCC customers as they are serviced by PCC resources. All real customer data is recorded during activity and resulting customer data may be managed at the physical contact center level but may be mirrored to the appropriate VCC that those customers belong to. A VCC may configure, for example, an outbound campaign for a PCC where the customer numbers to call and other recorded data are stored at the site of the PCC.

In one embodiment core application 400 includes a business management layer 403 for handling various business arrangements between a VCC and a PCC. Business management layer 403 may also provide reporting to VCC client applications for monitoring purposes. Core application 400 includes an interaction management layer 404 that is adapted to manage all VCC interaction volume in real time. The system using the interaction management layer 404 may initiate and request routing of physical interactions to PCCs following VCC to PCC rules and any available routing strategies. The interaction management layer handles all of the virtual queuing and monitoring of events for all connected VCCs.

One with skill in the art of server-client applications will appreciate that the core system application 400 may have more or fewer component layers than what is illustrated here without departing from the spirit and scope of the present invention. In one embodiment the core APP includes the client APPs previously described and clients must login to the service to use client applications. One with such skills in the art will also realize that there may be more or fewer component layers and components than that illustrated in this example without departing from the spirit and scope of the present invention.

Figure 5:
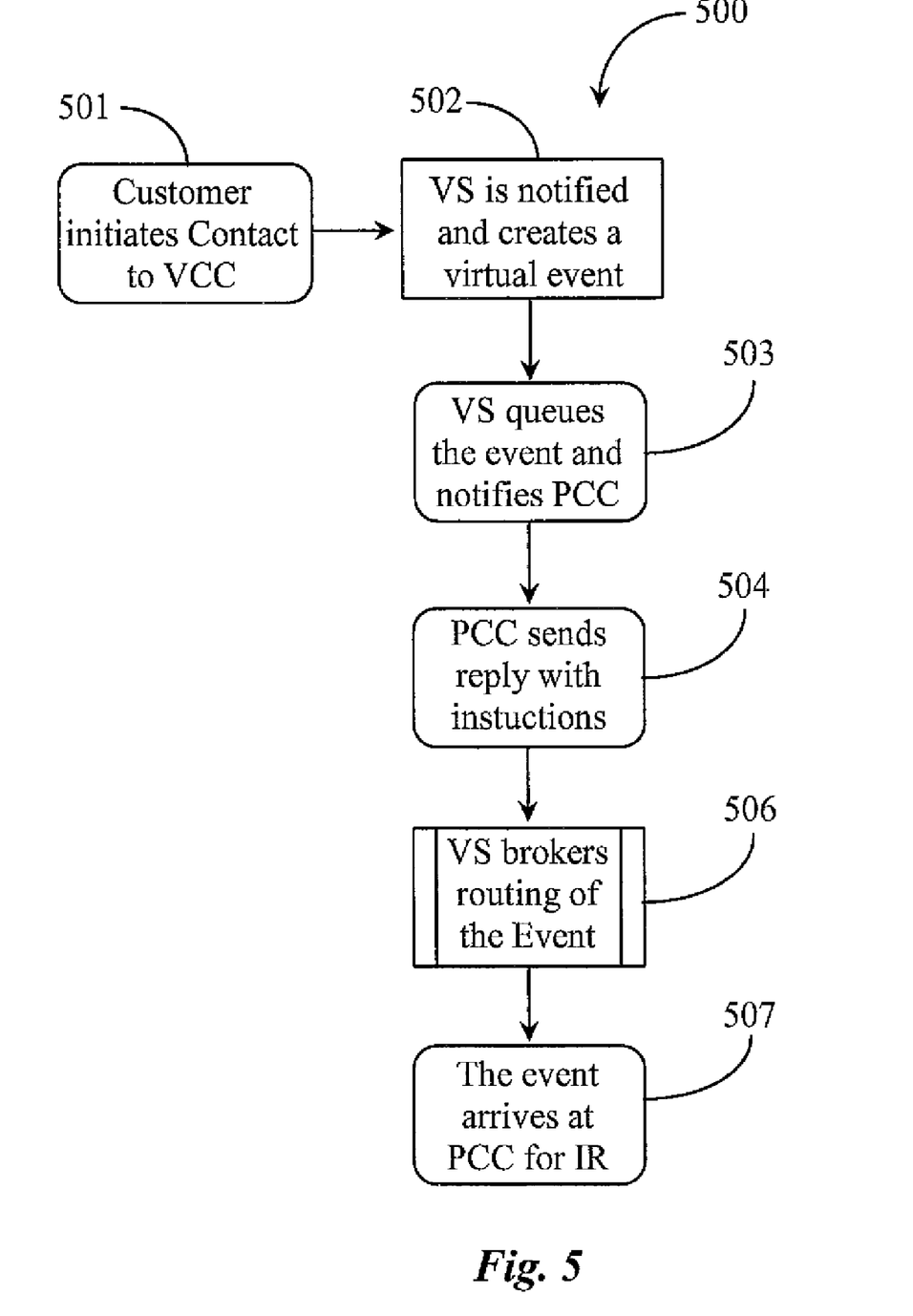
FIG. 5 is a process flow chart illustrating steps for managing an interaction event through the virtualization application of FIG. 4 according to an embodiment of the present invention.

FIG. 5 is a process flow chart illustrating steps 500 for managing an interaction event through the virtualization application of FIG. 4 according to an embodiment of the present invention. At step 501 a customer initiates contact to a VCC registered with the service of the invention. The contact may be initiated from any access number published by the VCC. The contact may be a telephone call, a VoIP call, chat request, or a message such as an IM or email message. A virtual server analogous to VS 108 running the core application analogous core application 107 is notified of the event and creates a virtual event. The event may be created within the interaction management layer of the application. Session initiation protocol may be the underlying communication protocol for routing and other communications.

At step 503 the core application places the event in a virtual queue representing a real PCC resource. Also at step 503 the core application notifies the PCC client authorized to service the VCC customer of the incoming event and requests routing information. At step 504 the PCC client replies to the core application with the appropriate routing information to route the event to the physical resource represented by the active virtual queue.

At step 506 the VS enabled by the core application brokers routing of the event for the VCC by sending the physical routing instructions to the routing point associated with the event. In this way the physical event is routed to the appropriate PCC entry point in the PCC system. The PCC may have general queues represented in the VCC level as virtual queues. At step 507 the routed event arrives at the PCC entry point for further internal routing if required. Any additional PCC queues for specific agents, agent groups, technical services, customer support, or the like are also virtualized at the VCC level as VCC queues. The VCC queues and abstract service definitions of those queues are visible to the VCC operator.

The PCC client reports the results of any internal routing back to the core application which exposes the activity for the VCC by representing the event in the correct virtual queue designated virtual queue, which is mapped to the physical queue. Therefore, the movement of the event through the PCC system can be tracked and represented in virtual state including queue residency and active handling. When the interaction is complete the virtual event is terminated but the interaction results are recorded at the PCC level. All interaction results and records may be mirrored to an online repository connected to the third-party server hosting the core application so that VCC client activity and statistical reporting interfaces may retrieve and present the data as a combination of records and/or statistics.

In one embodiment of the present invention a VCC may utilize specific services offered through a PCC. If the service offered through a PCC is at some point deemed less than satisfactory, the VCC may be moved to a completely different PCC. Such movement may take place gradually similar to moving a virtual machine to a different core CPU.

In one embodiment of the present invention a system of transaction servers known to the inventors can be used to provide routing instruction and interaction management service notifications to the core application and VCC access points. The underlying call control protocol can be T-Lib (library) and Internet Protocol Call Control (IPCC) language wrapped into a SIP message. Other telephony protocols may also be implemented. There are many possibilities.

It will be apparent to one with skill in the art that the virtual contact center system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for virtual representation of physical contact center resources comprising:
    a server coupled to a wide-area-network (WAN);
    a digital medium accessible to the server; and
    a resource virtualization application executable from the digital medium to run on the server;
    wherein at least one physical contact center having physical resources has access to the server over the network, and wherein the resource virtualization application categorizes and represents the physical resources in an abstract way for access by customers of one or more virtual contact centers, and wherein a virtual representation of a contact center resource is exposed only to a virtual contact center that requires the resource and can use the resource to transact business.

2. The system of claim 1 wherein the WAN is the Internet network including any connected sub networks.

3. The system of claim 1 wherein physical contact center resources are configured for representation as available virtual resources using a client portion of the resource virtualization application.

4. The system of claim 1 wherein the one or more virtual contact centers utilize the resources of one or more physical contact centers.

5. The system of claim 1 wherein a physical contact center resource is an automated system.

6. The system of claim 1 wherein a physical contact center resource is a live agent or a group of live agents.

7. The system of claim 1 wherein a virtual contact center may expose training materials and support information to one or more physical contact centers using a client portion of the virtualization application.

8. The system of claim 1 wherein the virtualization application includes an interaction management layer for virtually representing and tracking active interactions being processed by the available physical resources.

9. The system of claim 1 wherein the virtualization application includes a business management layer for keeping track of the business transacted through one or more virtual contact centers.

10. The system of claim 1 wherein the virtualization application includes a resource management layer for exposing resources and for providing reportable statistics about the use of and general states of those exposed resources.

11. A method for virtually representing a physical contact center resource to a specific customer base of a virtual contact center comprising the steps:
 (a) providing one or more access points including contact data to the customer base;
 (b) locating and qualifying the contact center resource for use by the customer base;
 (c) representing the resource of step (b) as an abstract entity in a software interface accessible to a human operator authorized to provide services to the customer base;
 (d) mapping the contact data provided to the customer base to the contact data of the contact center resource during routing; and
 (e) exposing a virtual representation of a contact center resource only to a virtual contact center that requires the resource and can use the resource to transact business.

12. The method of claim 11 wherein in step (a) the one or more access points include a telephone switch and or a Web page.

13. The method of claim 11 wherein in the virtual contact center is visible through a client interface running on a computing device having a user display.

14. The method of claim 11 wherein in step (b) a directory is used to locate available resources and qualification thereof determined by matching capabilities with service requirements for resource utilization.

15. The method of claim 11 wherein in step (c) the resource is represented by one or more queue icons.

16. The method of claim 15 wherein the one or more queue icons represent an agent queue, a queue for an automated service, or a queue for a group of agents.

17. The method of claim 11 further including a step (e) for creating virtual interaction events and for tracking progress of the interactions through the virtual contact center.

18. The method of claim 11 wherein in step (b) physical resources may be added or removed based on current needs of the virtual contact center.

* * * * *